US011910949B2

(12) United States Patent
Leeuwen et al.

(10) Patent No.: US 11,910,949 B2
(45) Date of Patent: Feb. 27, 2024

(54) BOILING POINT DETECTION AND HEATING SYSTEM

(71) Applicant: Wood Stone Corporation, Bellingham, WA (US)

(72) Inventors: Brett Van Leeuwen, Bellingham, WA (US); Amanda Zimmerman, Ferndale, WA (US); Mark Stephenson, Bellingham, WA (US); Stewart Good, Blaine, WA (US); Chase King, Bellingham, WA (US); Greg Bird, Ferndale, WA (US)

(73) Assignee: Wood Stone Corporation, Bellingham, WA (US)

(*) Notice: Subject to any disclaimer, the term of this patent is extended or adjusted under 35 U.S.C. 154(b) by 739 days.

(21) Appl. No.: 16/416,855

(22) Filed: May 20, 2019

(65) Prior Publication Data
US 2019/0350400 A1 Nov. 21, 2019

Related U.S. Application Data

(60) Provisional application No. 62/673,404, filed on May 18, 2018.

(51) Int. Cl.
*A47J 27/62* (2006.01)
*G05D 23/19* (2006.01)
(Continued)

(52) U.S. Cl.
CPC .......... *A47J 27/62* (2013.01); *G05D 23/1917* (2013.01); *G05D 23/24* (2013.01); *A47J 27/002* (2013.01); *A47J 27/004* (2013.01)

(58) Field of Classification Search
CPC ...................................................... A47J 27/62
See application file for complete search history.

(56) References Cited

U.S. PATENT DOCUMENTS

| 4,465,228 A | * | 8/1984 | Mori ................. A47J 27/62 126/374.1 |
| 4,660,734 A | | 4/1987 | Heaney et al. |

(Continued)

FOREIGN PATENT DOCUMENTS

| CN | 2889082 | 4/2007 |
| CN | 201759344 U | 3/2011 |

(Continued)

*Primary Examiner* — John J Norton
(74) *Attorney, Agent, or Firm* — Puget Sound Patents; Dwayne Rogge

(57) ABSTRACT

A method and an apparatus for preparing food. In one example the method comprises the steps of: providing a cooking pan; filing the cooking pan with a food item; wherein the food item is at least partially liquid; placing the pan in thermal connection to a heat source; thermally connecting a temperature sensor to the cooking pan at the temperature sensing location; heating the food in the pan via a heat source having a first thermal output until the food reaches the boiling point; electronically detecting the temperature via the temperature sensor as the food is heated; detecting the temperature as the food item boils, resulting in a phase change and corresponding drop in temperature; and reducing the thermal output of the heat source to a second thermal output.

9 Claims, 3 Drawing Sheets

(51) Int. Cl.
  *G05D 23/24* (2006.01)
  *A47J 27/00* (2006.01)

(56) References Cited

U.S. PATENT DOCUMENTS

| 4,665,292 | A | 5/1987 | Payne |
| 5,079,407 | A | 1/1992 | Baker |
| 5,947,370 | A | 9/1999 | Rona et al. |
| 6,206,564 | B1 | 3/2001 | Adamczewski |
| 6,301,521 | B1 | 10/2001 | Chen et al. |
| 7,573,005 | B2 | 8/2009 | Clothier |

FOREIGN PATENT DOCUMENTS

| CN | 102133037 A | 7/2011 |
| RU | 2013135433 A | 2/2015 |
| WO | 2019222743 A1 | 11/2019 |

* cited by examiner

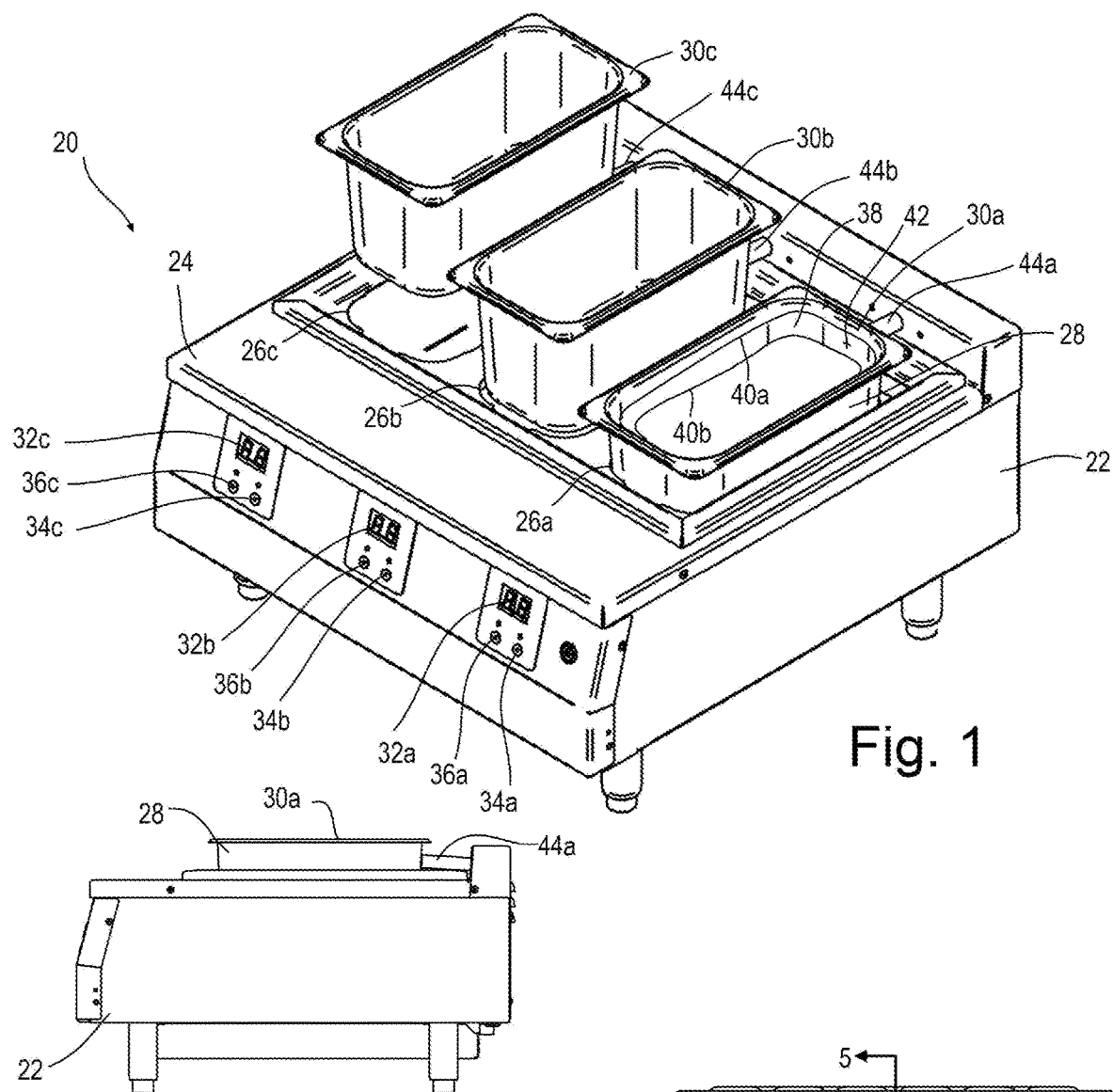
Fig. 1
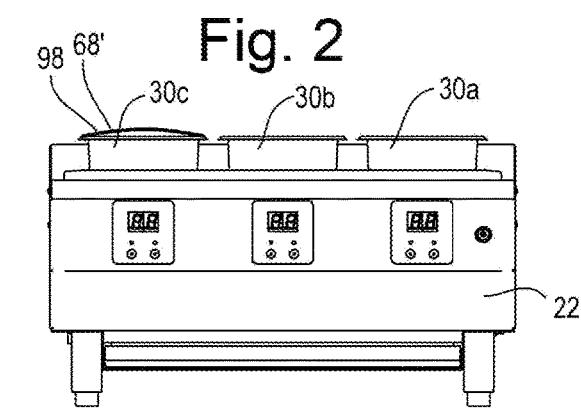
Fig. 2
Fig. 3
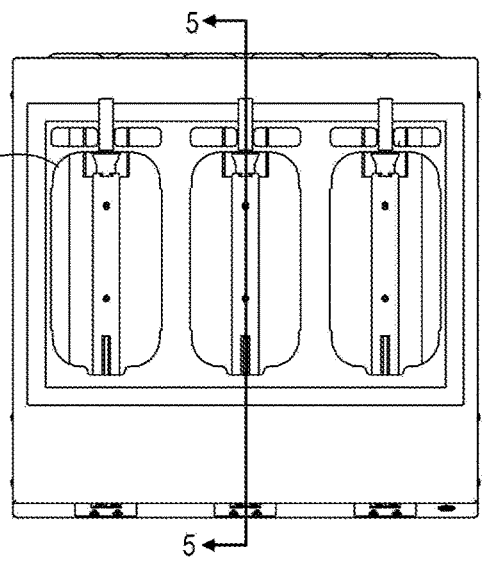
Fig. 4

BOILING POINT DETECTION AND HEATING SYSTEM

RELATED APPLICATIONS

This application claims priority benefit of U.S. Ser. No. 62/673,404 filed May 18, 2018 incorporated by reference.

BACKGROUND OF THE DISCLOSURE

Field of the Disclosure

This application relates to the field of cooking devices where the temperature of the food to be cooked is raised, then the power output of the heating element is reduced to maintain the food item at a continuous temperature during a cooking step. During the heating step, the measured temperature drops at the boiling point of the food item. This temperature drop is detected and used as a timing and temperature indicator.

Background Art

Previously, steam table pans such as disclosed in U.S. Pat. No. 4,660,734 (filed Apr. 4, 1986) were used for the maintained temperature control of food items after cooking, while being served to customers such as in a buffet. In such a steam table, food items are cooked a first location, generally in a first pan and then transferred to a separate steam table pan for serving. The temperature in the first location is generally higher for the cooking of the food item, wherein the temperature at the second location or steam table was generally lower to maintain the food item had a serving temperature. This results in significant expenditure of time not only in cooking and transferring of the food item from the first pan to the second pan but also results in food loss in the transition and the added time and expense of cooking multiple pans.

These prior art cooking systems often required the culinarian to carefully and constantly observe the food item during the cooking process and transfer the cooked food item to a separate serving pan within a certain time window to avoid overcooking of the food item at too high of the temperature and/or for too long of a period of time.

BRIEF SUMMARY OF THE DISCLOSURE

Disclosed herein is a method and an apparatus for preparing food, the method and apparatus reducing or eliminating many of the problems of current cooking methods and apparatuses. In one example the method comprises the steps of: providing a cooking pan; placing a food item in the cooking pan; wherein the food item is at least partially liquid; placing the pan in thermal connection to a heat source; thermally connecting a temperature sensor to the cooking pan at the temperature sensing location; heating the food in the pan via a heat source having a first thermal output until the food reaches the boiling point; electronically detecting the temperature at the sensor via the temperature sensor as the food is heated; detecting the temperature at the sensor as the food item boils, resulting in a phase change and corresponding drop in sensed temperature; and reducing the thermal output of the heat source to a second thermal output.

In one example, the sensor is pressed against an exterior of the pan. In one example the food is provided within the pan to a level below the temperature sensing location. In this example the sensor indicates the temperature of the pan above the food item and allows a more accurate reading of the phase change of fluid within the food item.

In one example, the thermal output of the heat source is pulsed once phase change of the food is detected.

The method may include a step wherein first and second thermal outputs are electronically controlled.

The method may include a step wherein the second thermal output is accomplished via pulsing of the heat source.

To facilitate the method above, a boiling point detection and heating system is disclosed, in one example comprising: a cooking pan having an outer surface and an inner surface configured to hold a volume of at least partially liquid food therein; a sensor configured to measure the temperature at the sensor; a variable heat source configured to heat the food within the pan; a detection system in communication with the sensor, configured to detect a phase change from liquid to gas of at a portion of the food as indicated by a temperature drop in the sensed temperature from a first cooking temperature; the heat source having a heat output which is reduced to a second cooking temperature upon sensing of the drop in temperature resulting from the phase change.

The boiling point detection and heating system may further comprise circuitry configured to electronically control the heat output of the heat source when the phase change is detected.

The boiling point detection and heating system may further comprise circuitry configured to pulse the heat output of the heat source between a first state and a second state.

BRIEF DESCRIPTION OF THE SEVERAL VIEWS OF THE DRAWINGS

FIG. 1 is a top perspective view of one example of a cooking device utilizing the disclosed apparatus and method with three (3) cooking pans in various positions relative to the heating components.

FIG. 2 is a side view of the apparatus shown in FIG. 1 with the opposing side view being substantially a mirror image thereof.

FIG. 3 is a front view of the apparatus shown in FIG. 1.

FIG. 4 is a top view of the apparatus shown in FIG. 1 with the cooking pans removed to show the internal components.

DETAILED DESCRIPTION OF THE DISCLOSURE

Figure 5:
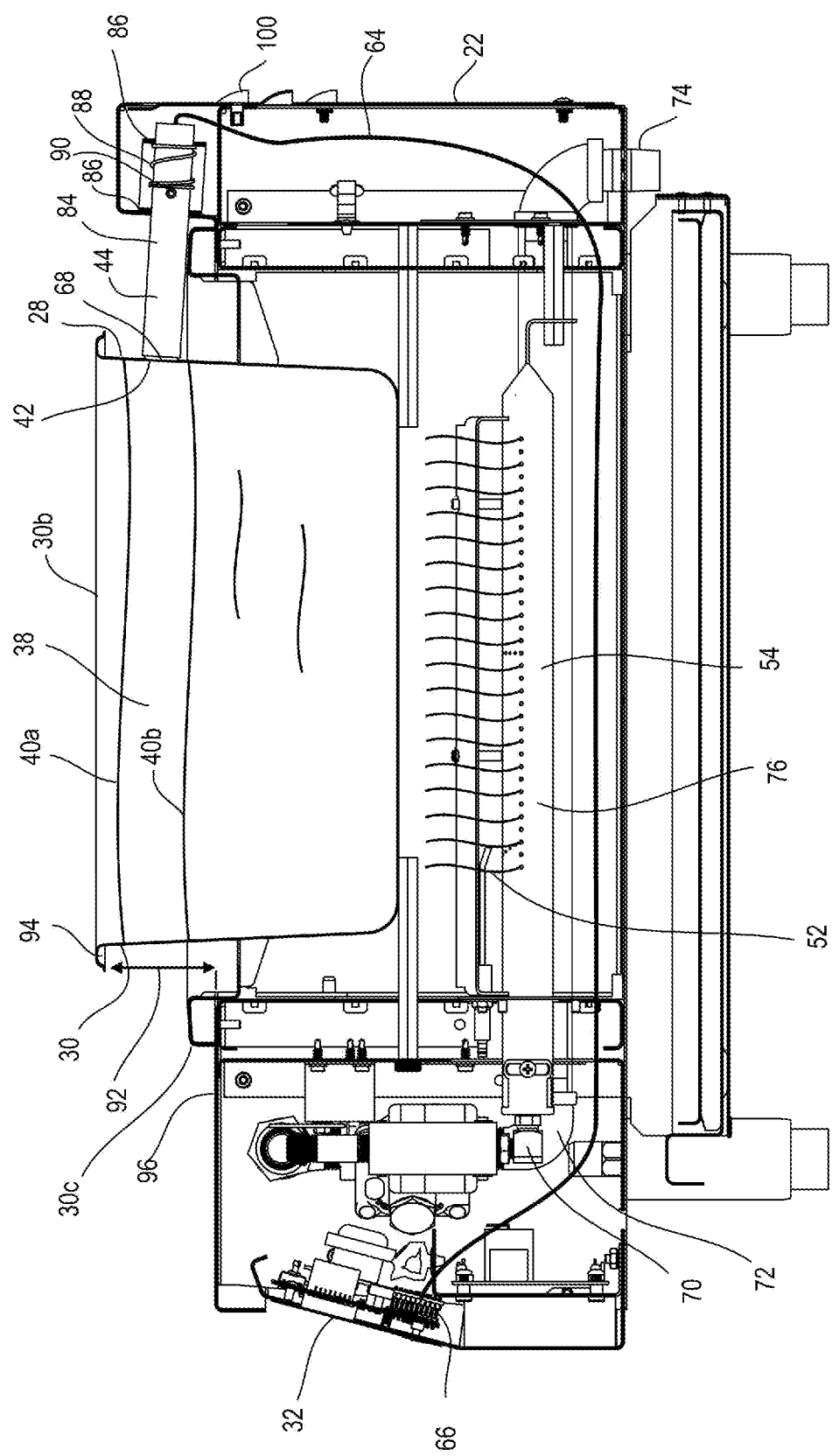
FIG. 5 is a side cutaway view taken along line 5-5 of FIG. 4.

Previously, steam table pans such as disclosed in U.S. Pat. No. 4,660,734 (filed Apr. 4, 1986) have been used for the maintained temperature control of food items after cooking the food items. The food items are placed into pans as disclosed in the 734 patent and heated to maintain a serving temperature while being served to customers. In such a steam table, food items are generally first cooked a first location, generally in a first pan and then transferred to a separate steam table pan for serving and often the temperature of the food item is maintained at a serving temperature, much lower than the cooking temperature of the same food item. The (cooking) temperature in the first location is generally higher for the cooking of the food item, wherein the (serving) temperature at the second location or steam table was generally lower than the cooking temperature to maintain the food item at a serving temperature without overcooking the food item. This constant observation results in significant expenditure of time not only in cooking and transferring of the food item from the first pan to the second pan but also results in food loss in the transition as not all the food is transferred from the first pan to the second pan and the added time and expense of cooking in and cleaning multiple pans. In addition, the prior system may be inefficient if the culinarian does not accurately observe the point at which the food item begins a phase change (boiling).

Known prior art cooking systems often required the culinarian to carefully and constantly observe the food item during the cooking process. This constant attention was to avoid overcooking of the food item at too high of a temperature and/or for too long of a period of time. In addition, it is customary to transfer the cooked food item to a separate serving pan for serving at a serving temperature.

To increase the efficiency over prior known steam pan cooking systems the disclosed apparatus and a method for using the apparatus have been invented. The method in one example includes a step of cooking food in a steam pan style cooking pan instead of a traditional style cooking pan. The food and the steam pan can then be transferred to a heated steam table for serving without transferring the food item to a separate container (steam pan). In one example of this process, the food is placed into the cooking pan, with sensors ascertaining the localized temperature of the pan at the sending location. In this process, the liquid portion of the food item is heated in a first cooking stage and eventually begins to change phase from a liquid to a gas (boil). At this transition phase, the sensor experiences a temperature drop as can be seen in our FIG. 6. This temperature drop may be electronically, optically, mechanically, or otherwise detected. One such temperature sensor is disclosed in U.S. Pat. No. 6,206,564B1. Detection of the temperature drop is then used to control (reduce) the thermal output of the heat source to maintain the food item at a desired temperature for a second stage of the cooking process.

To accomplish this new cooking method, a cooking apparatus 20 has been invented. One example of this cooking apparatus 20 is shown in FIG. 1-FIG. 5 although other cooking devices could be used to facilitate the inventive cooking method. In one example, the method comprises the steps of sensing and ascertaining the rising temperature of a cooking pan, food, or a region near the food or pan as the food is heated. During this first cooking stage (It has been found that a phase change of the food from liquid to gas (boiling) results in a dropping of the sensed temperature at the sensing location when properly selected. This temperature drop is then recorded electronically or otherwise and used to reduce the heat output of a heating element which is heating the food item to maintain the food at a lower cooking temperature that would be achieved if the thermal output were not reduced, and avoid over cooking or scorching.

The example cooking apparatus 20 as shown in the drawings comprises a housing 22 which contains, interconnects, supports, and protects many of the components. The housing 22 of this example having an upper surface 24 with one or more surfaces forming a cooking pan receiver 26 (26a-26c) forming a void through the upper surface 24 sized to allow passage of the exterior wall 28 of one or more cooking pans 30 (30a-30c). In example shown, a plurality of three (3) surfaces 26 (26a, 26b, 26c) forming voids through the upper surface 24 are each sized to accept passage of a cooking pan 30 (30a, 30b, 30c). In other examples, one, two, four, or more cooking pans 30 may be used with a single housing 20. In one example the cooking pans 30 are interchangeable or formed to allow more than one cooking pan 30 to fit in each surface 26.

In this disclosure, general elements have a numeric label and particular or multiple examples of these general elements may have an identifying letter, or letters. For example, a cooking pan is generally labeled 30 wherein the first example of a cooking pan is labeled 30a.

In this example, the cooking apparatus 20 comprises at least one readout 32 or graphic display. The readout 32 indicating one or more of: the temperature at the sensor probe, the elapsed time of cooking, the remaining time of cooking, time elapses since a phase change, or other desired information. In the example shown, a separate readout 32 (32a, 32b, 32c) is provided for each of the cooking pan receivers 26. In addition, the cooking apparatus 20 may comprise actuators/indicators 34 or 36 for use in controlling the apparatus as an on switch, off switch, indicator that the thermal output is generating heat, etc.

In the example of FIG. 1 it can also be seen that the first pan 30a has a volume of food 38 therein. The food 38 having an upper edge at a liquid level 40 (40a, 40b). In one example, only portion of the food 38 is liquid, the remainder of the food being solid or semi-solid. In other examples the entire food 38 is liquid. Stews, soups, chilis, casseroles etc. being examples of some foods which are only partially liquid with solid or semi-solid ingredients.

FIG. 1 also shows a temperature sensing location 42 which in this example is shown below the liquid level 40a and in another example is above the liquid level 40b. The temperature sensing location 42 of this example being marked on the interior of the pan, and symbolic of the point of contact on the exterior surface 28 where a sensor probe 44a contacts the cooking pan 30a.

The term "food" includes edible items generally including water or other liquid in which the food is cooked. For example, eggs in their shell may be cooked in water using the disclosed system and then removed from the water for further processing (removing a shell) and eating.

Figure 6:
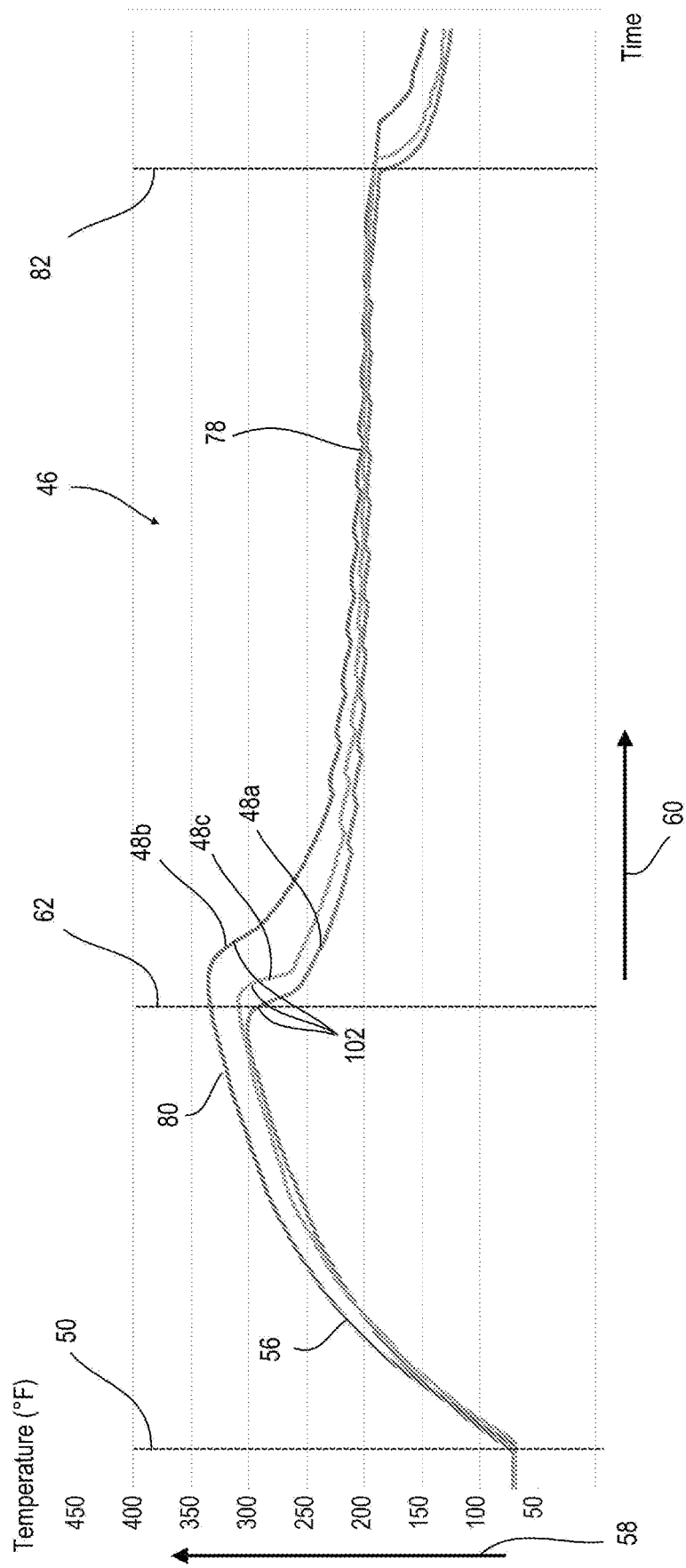
FIG. 6 is a temperature graph of the temperature in each of the three cooking pans shown in FIG. 1 in one example of a cooking operation.

Looking to FIG. 6 is shown a chart 46 depicting the heating, cooking, boiling, phase change, and warming stages of three cooking examples. This chart 46 includes a first plot 48a of a first data set measured at a first sensor probe 44a, a second plot 48b measured at the middle sensor probe 44b, and a third data set 48c measured at the right sensor probe 44c. A plot is a graphical technique for representing a data set, usually as a graph showing the relationship between two or more variables. These data plots show the temperature of the sensors 68 (68a-68c) as a function of time at each of the pans as measured at the sensor probe 44 (44a-44c) on the exterior of the cooking pan 30 with the liquid level at the level 40b below the sensor location 42.

In this example as shown in FIG. 6, it can be seen that the heating process begins at a start of cycle 50. At the start of cycle 50 of this example, the food 38 in each of the pans 30 is at a temperature below 125° F. The heat output 52 (often measured in BTUs or kw/hr) of the heat source 54 is increased and thus the temperature of the food 38 and pan 30 increases. This temperature increases as measured at the sensor 68 as shown in the first (heating portion) stage 56 of the data plot. The temperature increases 58 over time 60. Once the food 38 reaches a phase transition temperature (boiling) a phase change 62 occurs in the food 38. Generally this phase change occurs when the fluid in the food 38 begins to boil. This phase change decreases the temperature of the exterior of the pan 30 at or above the fluid level 40*b* as the steam or other vapor cools the pan above the food 38 as shown.

In this example, each sensor probe 44 is measuring the temperature of the exterior 28 of the pan 30, at or above the liquid level 40*b* of the food 38 being cooked. In this example, the pan 30 is heated via heat output 52 below the pan 30, although it could be heated via microwaves, radiant heat, or other methods and apparatuses. This heat output 52 increases the temperature of the exterior 28 of the pan, increasing the temperature of the pan 30 which is then transferred via conduction and/or convection in the case of a double walled pan to the food 38. In the particular example shown, heat and exhaust is then vented through the vents 100 in the housing 22. In one example, the vents 100 are positioned, below the temperature sensor 68.

While the heating stage 56 is taking place, before boiling (phase change 62) occurs, the sides 28 of the pan 30 may be hotter than the food item 38, and the sensing location 42 may measure a temperature higher than the boiling point of the food being cooked. The exhaust (heat output 52) may also directly heat the sensor probe 44, resulting in a sensed temperature higher than the food item 38. During this heating phase 56, the sensed temperature may be in the range of 260° F. to 300° F. When the change of phase 62 occurs, and the liquid in the pan 30 begins to phase change (boil), steam is produced, and a frothing/boiling action is induced in the pan 30. The steam and the boiling effect cool the side 28 of the pan 30 and the sensor 68. The sensor 68 then experiences a measurable drop in temperature 102. This resultant third cooking stage or drop in temperature 102 is detected by circuitry 66 and used as in indicator to reduce the heat output 52 in the fourth cooking stage 78.

In one example, the drop in temperature 102 measured at the side 28 of the pan 30 is sensed above the liquid level 40*b*. This temperature may be above boiling prior to a phase change of the liquid of the food 38, at which point the pan 30 is cooled quickly once the liquid below reaches boiling, due to the cooling action of the steam as well as splashing and frothing.

This temperature drop 102 is measured by the sensor 68 and relayed wirelessly or by way of data wire 64 to the readout 32 where in one example a culinarian reads the temperature to manually adjust the heat output 52 of the heat source 54. In another or cooperating example, to circuitry 66 is provided, configured to electronically alter the heat output 52 of the heat source 54 as the temperature drop 102 is detected.

In one example the circuitry 66 is electrically coupled wirelessly or via data wire 64 to the sensor 68 on the sensor probe 44. The circuitry 66 receives an electric signal from the sensor 68 and comprises apparatus configured to ascertain the temperature drop 102 and control the heat output 52 as a result of the temperature drop 102 caused by the phase change 62. In one example, the circuitry controls a valve 70 between a gas conduit leading from a gas inlet 74 and a burner component 76 of the heat source 54.

In one example, an independent valve 70, and independent burner 76 are provided for each cooking pan 30.

In another example, the heat source 54 comprises an electric, steam, infrared, convection, radiant, wood fire, or other heat source.

In one example, an altitude sensor 72 may be provided to allow the circuitry 66 to account for a variance in the boiling point temperature (e.g. phase change 62) as a function of altitude. This altitude sensor 72 may be a barometric pressure sensor, GPS location sensor, or equivalent component capable to detect the altitude and/or barometric pressure at the cooking apparatus 20. The circuitry 66 thus configured to account for this and adjust the cooking temperatures accordingly, allow the unit to automatically adjust the cook profile based on atmospheric pressure. In one example the atmospheric pressure data is determined via a barometer chip installed on a control board component of the circuitry 66. In another example, a culinarian may manually enter the altitude, or barometric pressure at the cooking apparatus 20. Atmospheric pressure, in addition to being an indicator of weather conditions, also changes with altitude. As is widely known, various cooking processes such as boiling and simmering are affected by altitude, and generally as altitude increases, time needs to be added to these cooking processes due to the lower temperatures at which boiling occurs. By having the capability to self-adjust based on atmospheric pressure, the disclosed cooking apparatus 20 is configured to compensate accordingly at different altitudes.

In one example, once the phase change 62 is indicated at the sensor 68, the output of the heat source 54 is reduced, and the temperature of the food 38 is reduced as shown in a fourth cooking stage 78 of FIG. 6. In some applications, the temperature of the food item 38 may be maintained at a cooking temperature 80 shown in FIG. 6 as a first for a time following the detected drop in temperature 102 in order to cook the food item prior to reducing to the fourth cooking temperature as indicated at 78.

For example, where a food item is to be cooked for a time before time is reduced, the circuitry 66 may be configured or programed via actuators 34/36 to so cook the food item at a cooking temperature indicated by contour 80 for a time.

In one example the opening of the valve 70 or other heating control apparatus may be pulsed, or opened and closed repeatedly at a specified and variable volume, duration, and/or interval to maintain the food item at a desired temp. For example, the food 38 may be maintained at the second cooking stage (temp) 80, or the fourth cooking stage (temp 78). Pulsing herein defining a state where the valve or heat source is oscillated between a first state which produces a higher heat output than a second state. In one example, the second state is a closed valve, or no heat output.

In one example, once the end of cook cycle 82 is reached, the heat output 52 is ceased, and the pan 30 with food 38 is removed and re-located to a serving location. In one example, the serving location is a steam table, steam tray, heat lamp warmer, or other apparatus with a heating apparatus configured to maintain the food 38 at a serving temperature generally lower than the cooking temperature(s).

In one example, most easily seen in FIG. 5, the cooking apparatus 20 comprises the sensor 68 affixed to a sensor probe 44 as previously discussed. In this example, the sensor probe 44 comprises a pressure bar 84 which slides upon a receiver 86. A spring 88 or equivalent device may be used to bias the pressure bar 84 and sensor 68 removably against the exterior 28 of the pan 30. In the example shown, a pin 90 is used, wherein the spring 88 is in tension between the pin 90 and the receiver 86.

In the example shown, there is a vertical gap 92 between the lip 94 or upper edge of the pan 30 and the upper surface 96 of the cooking apparatus 20 around the pan 30 when the pan 30 is fully rested upon support apparatus within the housing 22. This gap 92 makes it easy for a culinarian to grasp the lip 94 and lift the pan 30 from the cooking apparatus 20.

In a separate example, shown in FIG. 3, the sensor 68' may be provided on a lid 98 removably fitted to one of the pans 30.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A method for preparing food comprising the steps of:
providing a cooking pan;
filing the cooking pan at least partially with a food item up to a liquid level;
wherein the food item is at least partially liquid;
placing the cooking pan in thermal connection with a heat source;
thermally connecting a temperature sensor to the cooking pan at a temperature sensing location;
heating the food item in the pan via the heat source having a first thermal output until the food item reaches a phase change;
electronically detecting the temperature of the cooking pan at the temperature sensing location via the temperature sensor as the food item is heated;
detecting the temperature of the cooking pan at the temperature sensing location as the food item reaches the phase change via a corresponding drop in temperature of the cooking pan at the temperature sensor; and
reducing the thermal output of the heat source to a second thermal output.

2. The method as recited in claim 1 wherein the food item fills the pan to a fluid level below the temperature sensing location.

3. The method as recited in claim 1 wherein the temperature sensor is in direct contact with an exterior surface of the cooking pan.

4. The method as recited in claim 1 wherein the second thermal output of the heat source is pulsed once the phase change of the food is reached.

5. The method as recited in claim 1 wherein first and second thermal outputs are electronically controlled.

6. A boiling point detection and heating system comprising:
a cooking pan having an outer surface and an inner surface configured to hold a volume of at least partially liquid food therein;
a sensor configured to measure the temperature of the cooking pan;
a variable heat source configured to heat the food within the pan;
a detection system in communication with the sensor, configured to detect a phase change from liquid to gas of a portion of the food as indicated by a drop in the temperature of the cooking pan resulting from the phase change;
the heat source comprising a first heat output which is reduced to a second heat output upon sensing of the drop in temperature resulting from the phase change.

7. The boiling point detection and heating system as recited in claim 6 further comprising circuitry configured to electronically control the heat output of the heat source when the phase change is detected.

8. The boiling point detection and heating system as recited in claim 7 wherein the circuitry is configured to pulse the heat output of the heat source at the second heat output.

9. The boiling point detection and heating system as recited in claim 7 further comprising an altitude sensor coupled to the circuitry to account for the phase change temperature as a function of altitude.

* * * * *